April 4, 1961 R. W. HILL 2,977,795
LIQUID METERING SYSTEM
Filed Aug. 9, 1956 7 Sheets-Sheet 1

FIG. 1

INVENTOR.
RALPH W. HILL
BY

ATTORNEY

FIG. 2

INVENTOR.
RALPH W. HILL
BY
*Goodwin*
ATTORNEY

April 4, 1961  R. W. HILL  2,977,795
LIQUID METERING SYSTEM
Filed Aug. 9, 1956  7 Sheets-Sheet 3

INVENTOR.
RALPH W. HILL
BY
ATTORNEY

FIG. 8

United States Patent Office 2,977,795
Patented Apr. 4, 1961

2,977,795

LIQUID METERING SYSTEM

Ralph W. Hill, Tulsa, Okla., assignor to Pan American Petroleum Corporation, a corporation of Delaware Filed Aug. 9, 1956, Ser. No. 692,993

8 Claims. (Cl. 73—198)

This invention relates to the automation of oil and gas leases. More particularly this invention relates to mechanization in the custody transfer of oil from an oil producer or generally from storage, e.g., a tank, to an oil pipeline. In this automation of measurement and control the routine operations typically carried out manually by a lease pumper and a pipeline gauger are mechanized so that the oil from a lease can be metered and run to the receiving pipeline automatically and without human control and the resultant human errors and inaccuracies.

In the transfer of custody from the oil producer to the oil pipeline, a number of routine operations which are time consuming have been performed by the lease pumper or switcher and the pipeline gauger. After the oil in a lease stock tank is ready to be run to the pipeline, the pumper in the past has notified the pipeline gauger. They then arrange to meet at a mutually convenient time to gauge, thief, and take the temperature of the oil in the lease stock tank. From the thiefed sample the pipeline gauger determines in a centrifuge machine whether the oil meets specifications, i.e., whether the quantity of basic sediment and/or water (sometimes hereinafter referred to as B.S. and W.) is within the maximum limitation. He may also determine other properties of the oil such as gravity, viscosity, Reid vapor pressure, flash point, color, etc. If the quality of the oil is up to standard, the outlet to the lease stock tank or tanks is opened and the oil is run to the pipeline either by gravity or by pump. After sufficient time has elapsed to permit all the oil to flow into the pipeline, the gauger returns, closes the outlet valve, takes the temperature and a sample of the remaining oil, makes a back gauge to determine the amount of liquid left in the tank and, accordingly, the amount of liquid transferred. Obviously, all of these routine operations are desirably performed during daylight due to the inconvenience and hazards of nighttime operations. The custody transfer of oil thus consumes a great deal of time and labor and additionally, due to only part time use, the efficiency of the pipeline system is low.

It is an object of this invention to provide an improved liquid metering and control system so that the aforementioned routine or manual operations involved in the custody transfer of liquid can be accomplished without the continuous presence of personnel. It is a more specific object of this invention to provide a production or storage tank which accumulates the oil production from a lease, a metering tank, and associated test and control equipment which together automatically and periodically sample, measure, determine temperature, and run liquid from the production tank to a receiving pipeline. It is a still more specific object of this invention to provide an apparatus which first determines the quantity and quality of crude oil in a storage tank and then, providing the quantity and quality meet certain predetermined standards, meters that oil and transfers it to a pipeline. Other objects and advantages of this invention will become apparent from the following description. In this description reference will be made to preferred apparatus and procedure which are illustrated in the drawings. In these drawings:

This invention in brief may be described as a metering system particularly adapted for testing and measuring a quantity of liquid particularly crude oil and automatically transferring custody thereof from the oil producer to a pipeline. More specifically this invention may be described as an improvement in an automatic custody transfer system for a liquid containing solids which precipitate therefrom, involving one or more production tanks and a metering tank in which the metering tank is generally maintained empty except for a brief interval while it is being filled and emptied so that the accumulation of paraffin and other solid or semi-solid deposits on the walls, etc., of the metering tank is prevented, this metering tank being maintained normally empty by first automatically determining the quantity and quality of the liquid in the production or accumulator tank before the inlet valve to the metering tank is permitted to open. Thus, flow to and from the metering tank, once started, is not interrupted to permit the deposition of solids in the metering tank.

Figure 1:
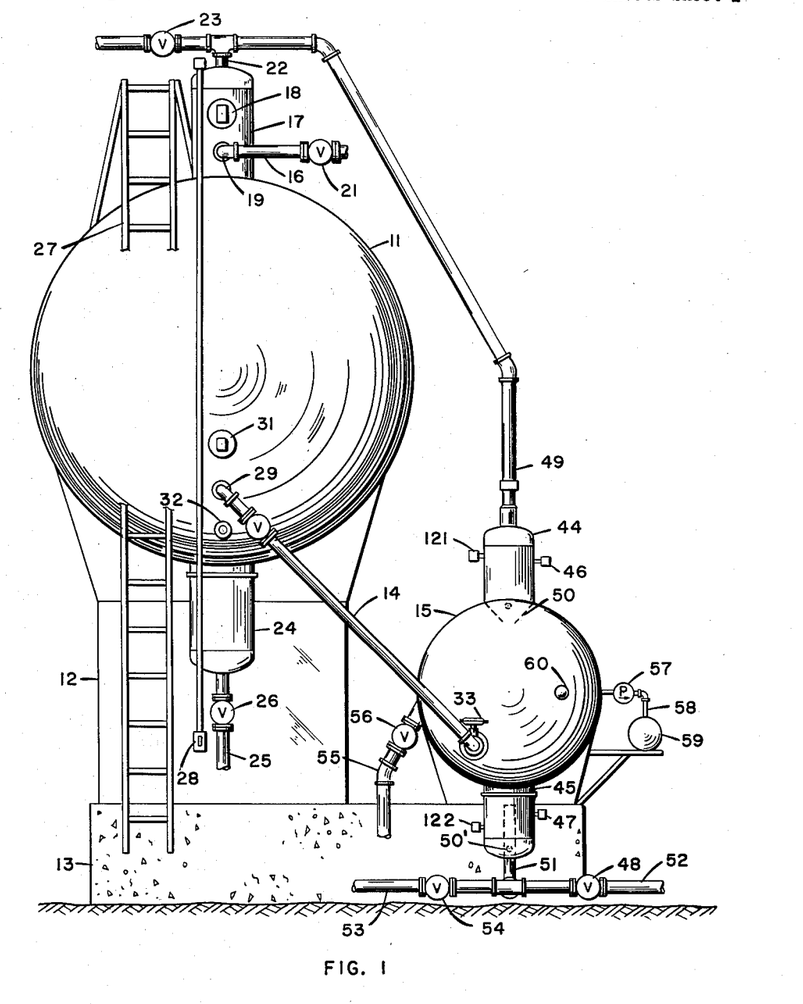
Figure 1 is an elevation view of my improved tank battery showing the general layout of my improved tank battery.

Referring now to Figure 1 of the drawings for a more detailed description of a preferred embodiment of this invention, the typical tank battery in this system comprises one or more storage or oil production tanks 11 in which oil from the lease accumulates. This tank is desirably elevated on a structural support 12 and foundation 13 so that the inlet to production tank outlet line 14 is above the high liquid level of the metering tank 15 and so that oil from this tank will flow by gravity through the production tank outlet line to the metering tank. The production tank is filled from the inlet line 16 which extends either directly to the wells on the lease or to treating facilities adapted to separate oil from any water which might be produced with the oil so that any oil entering the production tank is generally "pipe-line" oil, i.e., meets pipe line specifications and is acceptable to a receiving pipe line. In the usual situation, oil produced from a well by pumping or flowing is first passed through a gas separator, a water separator, and in some cases a dehydrator such as a heater-treater before entering the production tank. This degassing and dehydrating equipment which is required on many leases for producing pipe-line oil is the same in this and the customary tank battery and, therefore, is not shown or described herein in detail. This pipe-line oil enters the production tank preferably through a seraphin neck or dome 17 on top of the tank. A high level safety float and pilot control 18 may be placed in this dome above the oil inlet 19 and connected with the pneumatic system hereinafter described for the purpose of actuating a pneumatic inlet valve 21 to shut down the lease and prevent overflow of the production tank in case of an emergency such as the failure of the pipe line to take oil from the system as fast as oil is produced by the lease. A vent line 22, having a pressure relief valve 23, is connected to the top of the dome 17 to maintain a small back pressure on the production tank and vent excess gas therefrom at a safe distance from the production tank. A water accumulation chamber 24 is provided at the bottom of the production tank for the accumulation of high density water-oil emulsions or other basic sediment and water. This dense liquid may be drained off either continuously or intermittently by either manual or automatic means through water drain line 25 and valve 26. While not necessary for the operation of this system, a ladder 27 and a ground level reading gauge 28 showing the position of the oil surface inside of tank 11 may for convenience be provided on the production tank. The production tank oil outlet 29 is located a substantial distance, typically 1–2 feet, above the bottom of the tank, as customary in a lease stock tank, to provide capacity below the outlet for the substandard oil bottoms to settle out and be withdrawn through line 25 and to allow the lighter pipeline oil to be separated therefrom and removed from the tank. A low level float and pilot control 31 is placed in the production tank above the oil outlet 29, the distance above the outlet being great enough to provide in the production tank between the outlet and the low level float and pilot control a volume at least as great as, and preferably slightly greater than, the volume of the metering tank 15. In a typical operation the metering tank is substantially smaller than the production tank. The productoin tank desirably holds the lease production for at least one and preferably two or more days. The metering tank may have a volume of about 5–150 barrels, typically about 50 barrels, and the production tank a volume of about 250–1000 barrels or more. The distance between the production tank oil outlet 29 and the low level float and pilot control 31 would therefore be great enough to provide in the production tank a volume of about 50 or more barrels when the metering tank has a volume of 50 barrels. An oil quality monitor or probe 32, which is adapted to determine the concentration of water and in some cases other impurities in the oil, is located in the production tank preferably below the outlet 29. This probe and the low level float and pilot control 31, as will be explained in greater detail hereinafter, are connected in the pneumatic system for controlling the operation of the metering tank inlet valve 33 which is located in line 14 connecting the production and metering tanks.

Metering tank 15, as indicated previously, is set on foundation 13 and desirably located so that the top oil level of the metering tank is at a lower elevation than the outlet of the production tank 11 so that oil will flow by gravity from the production tank to the metering tank. It will be understood however that in some cases the production and metering tanks may both be set at the same elevation, e.g., at ground level and the oil may be transferred from the production tank to the metering tank by pumps or other suitable transfer means. The metering tank has an upper dome or seraphin neck 44, the top of which is typically located at about the same elevation as the production tank outlet 29. This upper seraphin neck and the lower seraphin neck 45 are provided on the metering tank so that the volume between upper float and pilot control valve 46 and lower float and pilot control valve 47 may be accurately controlled. That is, the seraphin necks having a much smaller cross sectional area than the metering tank 15 in any horizontal plane, a minor variation in the level of liquid in the metering tank when inlet valve 33 or outlet valve 48 is closed, will produce only a negligible error in the volume measurement. A gas vent and pressure equalizing line 49 is connected between the top of seraphin neck 44 and vent line 22. A damping plate 50, which is preferably perforated and conical as indicated, may be placed in the bottom of the upper seraphin neck so that when the oil level in the metering tank rises in the seraphin neck, due to the restricted opening in the plate, it will pass upper float and pilot control valve 46 slowly, further to improve the accuracy of measure. Similarly, the outlet pipe 51 is desirably extended into the lower seraphin neck 45 to a position above the lower float and pilot control valve 47 so that as the oil level approaches the elevation of this valve oil will cease to enter through the open upper end and will flow through a restricted opening 50' thereby reducing its velocity as the oil level passes the valve and increasing accuracy of measurement. The metering tank outlet line 51 connected to the bottom of lower seraphin neck 45 drains the metering tank through the outlet valve 48 to the pipeline 52. The drain line 53 including a valve 54 may be connected to the metering tank outlet line 51 to drain the metering tank in an emergency or when the metering tank is being cleaned. Since the volume of the metering tank is small in comparison to the volume of the conventoinal production tank and since a minor error in the volume of the metering tank would thus be magnified and reproduced many times, it is highly desirable that the volume of the metering tank remain constant. Accordingly, as indicated above, this metering tank is maintained empty except as it is being filled and emptied; it is never allowed to remain either partially or fully filled for any appreciable length of time. In case it does become desirable to flush paraffin or other solid deposit from the inner surface of the metering tank walls, from the floats, etc., within the metering tank an oil flush line 55, which contains a normally closed valve 56 is provided to introduce hot oil or some other solvent for the deposit into the metering tank as desired. This solvent may then be removed through drain line 53. Valves 54 and 56 are typically sealed, i.e., made tamperproof to prevent or at least indicate unauthorized removal of oil from the metering tank or use of the valves except when the tank is being cleaned. A sample pump 57, which is typically located at the midpoint vertically of the metering tank, takes a representative sample of each metering tank full of liquid, discharges it through line 58 into a pressure sealed sample accumulation chamber 59. The sample pump 57 takes only a small but fixed volume of oil from each metering tank of oil, typically about 5–25 milliliters and discharges it into the sample accumulation chamber which maintains the sample under pressure to prevent loss of volatile components. This sample accumulation chamber typically holds from about one to about 5 or more gallons of liquid so that samples from as much as a month's run may be accumulated. Preferably, this sample accumulation chamber includes heating and agitating equipment so that before the accumulated sample is withdrawn therefrom the oil may be heated and stirred to recombine the solids precipitated on the walls with the liquid and thus be restored to the conditions prevailing as they entered the container. A temperature sensitive element such as a thermocouple or temperature bulb 60 is also located at approximately the midpoint vertically of the metering tank to record the temperature of each tank full of oil passing through the metering tank as explained in greater detail hereinafter.

Figure 2:
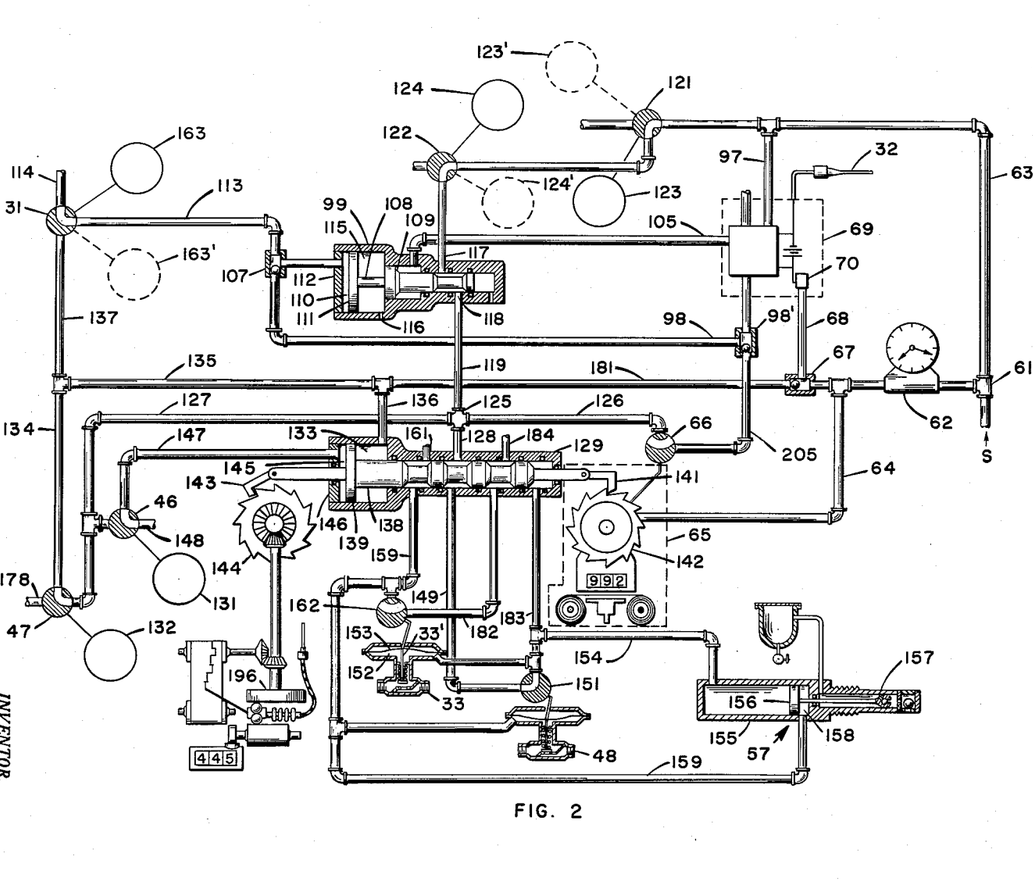
Figure 2 is a schematic flow diagram of a pneumatic system for controlling the custody transfer of liquid in the apparatus shown in Figure 1, the controls being in a position to fill the empty metering tank from the production tank.

Referring now to Figure 2 for a more detailed description of the mechanism for controlling the operation of the metering tank inlet valve 33 and outlet valve 48 and otherwise automatically running or measuring oil, a supply of gas such as natural gas from the lease gas separator or an air compressor or the like (not shown) is connected to the pneumatic system at inlet T 61. This gas passes to two separate systems, one part going through the pipeline or buyer's clock and control valve 62 for initiating the operation and the other part going through line 63 to the control valves, etc., as hereinafter explained. The buyer's clock and control valve typically includes a clockwork which will run for a month or more and an associated control mechanism which opens and closes a control valve at a predetermined time each day or at a predetermined time on selected days. The control valve remains open for only a few minutes, typically 5-10 minutes each day, which is sufficient to check the quality and quantity of the oil in the production tank and then open the necessary valves to commence the daily running operation. This daily running operation may start at any hour of the day or night at the buyer's or pipeline's convenience so that flow from this and other such tank batteries may be correlated in a more efficient system in which oil is run continuously and at substantially constant volume from the integrated system. Thus, while each battery may produce its daily allowable within a few minutes or a few hours each day, the various buyer's clocks and control valves in an integrated system are set to open at staggered time intervals so that the pipeline system is in operation continuously throughout the day and thus operates more efficiently. Gas passing through the buyer's clock and control valve 62 goes first through line 64 to the allowable control box 65 which is shown in greater detail in Figure 6. On the basis that the daily or monthly allowable from this lease has not been produced, the allowable control valve 66 remains closed and permits the daily operation to proceed. Gas from the buyer's clock and control valve 62 also passes through the double check or 2-way check valve 67 and line 68 to a quality control box 69. One type of apparatus within this box for monitoring the quality of liquid being run is shown in greater detail in Figure 3.

Figure 3:
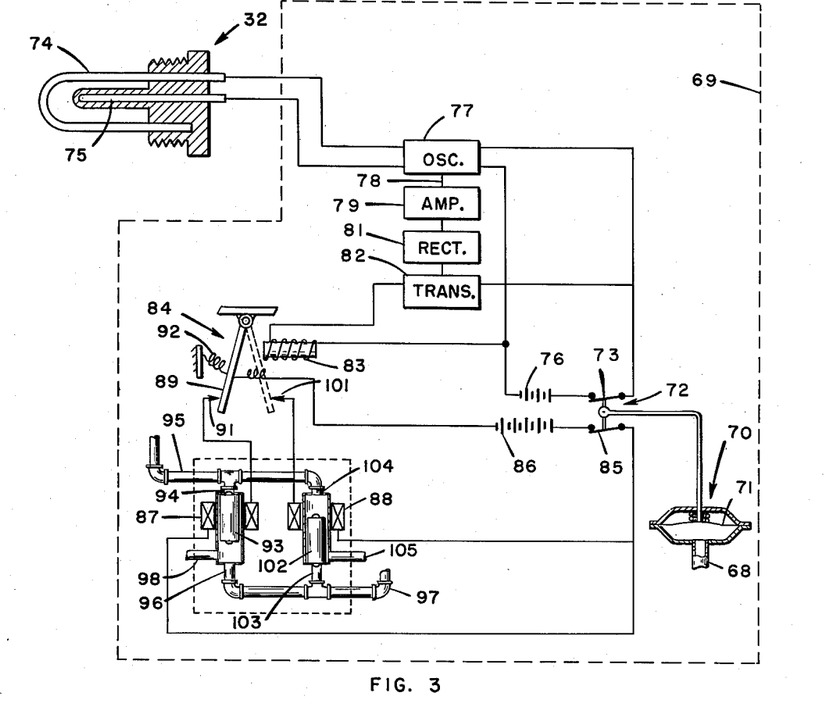
Figure 3 is a schematic wiring diagram of a control system which first determines whether the quality of the oil in the production tank is up to a predetermined standard and then actuates the necessary valves to run the oil to the metering tank.

This gas passes to a pressure switch 70 such as a Meletron, manufactured by Barksdale Valves, Los Angeles, California, which includes a diaphragm 71 and a double pole single throw switch 72. Upper pole 73 of this switch energizes the probe 32 which is this case is indicated to be a capacitance type monitor in which the insulated electrodes or plates 74 and 75 are inserted in production tank 11 preferably below fluid outlet 29 as described above. By closing switch 73, battery 76, which is typically a mercury battery having a voltage output that remains substantially constant regardless of the charge, energizes an oscillator 77 of which the probe 32 is a part. The oscillator may be of the tuned circuit type that produces an "on" or "off" signal by comparing one parameter such as capacitance, resistance or inductance with a standard maintained at the same temperature. It is adjusted, as is well-known in the art, to oscillate and produce an output or "on" signal in line 78 when the capacitance between electrodes 74 and 75 is below a predetermined amount. With a larger capacitance between the electrodes the circuit does not oscillate and therefore produces an "off" signal. This limiting capacitance is determined mathematically or by trial and error so that when the liquid in the tank at the elevation of the probe contains more than about ½–1 percent water, depending upon the limitations prescribed by the buyer, the capacitance of the probe is so small that the oscillator is off and there is no output signal to the amplifier 79. When the capacitance or other parameter of the liquid between electrodes 74 and 75 is above the predetermined limit, oscillator 77 passes a signal, which is amplified in amplifier 79, to rectifier 81 and thence to an electronic switch such as a transistor 82. When this transistor is thus energized it passes current from battery 76 through upper switch 73 of double pole single throw switch 72 and thus through winding 83 of a spring loaded solenoid switch 84.

The press of the gas in line 68 at the time it closes upper switch 73 simultaneously closes lower switch 85 so that battery 86 energizes either 3-way solenoid valve 87 or 3-way solenoid valve 88. In the position shown, the toggle 89 of solenoid switch 84 is held in contact with pole 91 by spring 92. Solenoid valve 87 is thus normally energized and solenoid valve 88 is energized only after the quality of the liquid in the probe is tested and passes the predetermined standard. When the quality of the oil in the probe is substandard and solenoid valve 87 is energized, plunger 93 rises, closing the outlet 94 to the atmospheric exhaust line 95 and opening the gas inlet 96 which is connected by line 97 to line 63 as shown on Figure 2. Pressure gas from the supply is thus directed into line 98 including 2-way check valve 98' closing the master control valve 99, or if already closed, maintaining it closed.

When the quality of the oil surrounding electrodes 74 and 75 meets the predetermined minimum, as discussed above, the oscillator 77 via transistor 82 energizes winding 83 which pulls toggle 89 against the force of tension spring 92 into contact with pole 101. Current from battery 86 then passing through lower switch 85 and solenoid switch 84 including pole 101, energizes 3-way solenoid valve 88 lifting the plunger 102 off of gas inlet 103 and closing the outlet 104 to atmospheric exhaust line 95. At the same time that 3-way solenoid valve 88 is energized, solenoid valve 87 is de-energized and thus closed due to the movement of toggle 89 away from pole 91. The opening of gas inlet 103 and the closing of atmospheric exhaust line 95 by lifting plunger 102 causes the gas pressure in line 97 to be directed into line 105 which, as indicated in Figure 2, passes to and opens the master control valve 99.

Assuming that the quality of the liquid in production tank 11 is above the predetermined minimum and that 3-way solenoid valve 88 is thus energized and gas pressure is applied to the master control valve via line 105, the valve member 108 is moved to the left by the pressure of the gas acting on the right side of small piston 109. Gas in the chamber 110 between the large piston 111 and the cylinder head 112 is displaced through 2-way check 107, line 113, the production tank low level float and pilot control valve 31, and line 114 to the atmosphere. At the same time air is drawn into chamber 115 through port 116 from the atmosphere. When pressure is thus applied to the master control valve via gas line 105 and valve member 108 is moved to the left, inlet port 117 and outlet port 118 of the master control valve are connected, i.e., the master control valve is opened and passes gas from the supply into line 119. Gas from the supply must, however, first pass through the metering tank high level safety valve 121 and the metering tank low level safety valve 122. If the metering tank high level safety valve float 123 is up (in dotted position 123') and metering tank high level safety valve 121 is closed, as might happen if upper float and pilot control valve 46 failed to function properly or if float 124 is in the lower position (124') and metering tank low level safety valve 122 is closed, as might happen by the failure of lower float and pilot control valve 47 to function properly, the gas supply to the master control valve 99 would be previously cut off and no gas would pass through the master control valve into line 119. The metering tank high and low level safety valves are, however, but for such unusual situations, normally open so that when the master control valve 99 is open gas is admitted to line 119. Line 119 is connected to a cross 125 from which it goes through line 126 to allowable control valve 66, through line 127 to the metering tank upper float and pilot control valve 46 and the metering tank lower float and pilot control valve 47, and through line 128 to sequence control valve 129.

At the start-up each day the metering tank is empty, i.e., empty to the level established by lower float and pilot control valve 47, and therefore float 131 of upper float and pilot control valve 46 and float 132 of lower float and pilot control valve 47 are down, i.e., in a lower position as shown in Figure 2. Consequently the latter valve is open and passes gas from line 127 into chamber 133 of sequence control valve 129 via lines 134, 135, and 136. Assuming at least one metering tank full of oil in production tank 11, flow through line 137 is shut off by production tank low level float and pilot control valve 31. The pressure built up in chamber 133 therefore displaces the sequence control valve member 138 to the left by reaction against the right side of piston 139. Movement of this member causes the ratchet 141 to rotate the allowable gear 142 one step counterclockwise and at the same time moves the ratchet 143 to the left so that it is ready to rotate the temperature integrator gear 144 one step in the same direction when the sequence control valve member 138 moves to the right. As piston 139 is moved to the left by the injection of gas into chamber 133, gas in chamber 145 between piston 139 and cylinder head 146 is displaced through line 147, upper float and pilot control valve 46 and line 148 to the atmosphere. This same movement of the sequence control valve member connects line 128 with line 149 so that gas passes through the interlock valve 151 on metering tank outlet valve 48 to the gas chamber 152 under pressure diaphragm 153 of metering tank inlet valve 33. Movement of this diaphragm by the gas pressure raises the inlet valve member 33' and thus opens the metering tank inlet valve 33 so that liquid from the production tank flows through line 14 into metering tank 15. At the same time, pressure in line 149 is transmitted via line 154 to the power cylinder 155 of sample pump 57, displacing power piston 156 and direct connected pump piston 157 to the right to the position shown in Figure 2. As the power piston 156 is moved to the right, gas from chamber 158 is displaced through line 159, sequence control valve 129, and vent line 161 to the atmosphere. As the metering tank inlet valve 33 is opened, the interlock valve 162 is rotated to the position shown in Figure 2 and thus closed.

In case the liquid level in production tank 11 is below production tank low level float and pilot control valve 31 so that float 163 is in the lower position 163', when metering tank lower float and pilot control valve 47 opens into line 134 and 137, this low level float and pilot control valve 31 directs gas from line 137 into line 113 and via double check valve 107 into chamber 110 displacing piston 111 and master control valve member 108 to the right, thus shutting off the supply of gas to the sequence control valve 129 and preventing the metering tank inlet valve 33 from opening. Thus, as indicated previously, whenever either the quality of liquid between the electrodes 74 and 75 is below a predetermined standard or whenever the quantity of liquid in the production tank is below a predetermined minimum, the master control valve is closed and the metering tank inlet valve cannot be opened and therefore the metering tank is maintained empty. A few minutes, typically 1–3 minutes, is normally adequate to make this preliminary determination of quality and quantity of liquid in the production tank and, once these determinations have been made and the master control valve is in an open position, the buyer's clock and control valve 62 can be closed and the operations of filling and emptying the metering tank from the production tank can be carried on until they are shut down by a change in quality or a change in quantity of the oil in the production tank or by the allowable control mechanism as hereinafter described.

Figure 4:
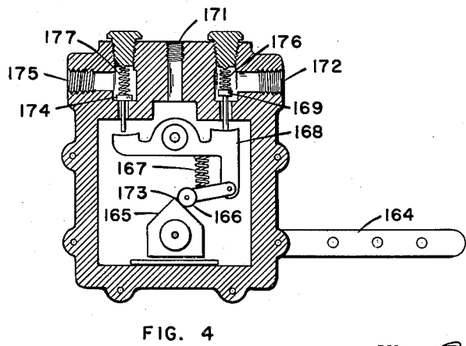
Figure 4 is a cross sectional view of a three-way snap-acting valve used in a pneumatic system such as that shown in Figure 2 for controlling the operation of valves, etc.

Typically the control valves such as the production tank low level float and control valve 31, the metering tank high and low level safety valves 121 and 122, the metering tank high and low level float and pilot control valves 46 and 47, the allowable control valve 66, and the interlock valves 151 and 162, are 3-way snap-acting valves such as is shown in detail in Figure 4. The float or control member for the valve is connected to the arm 164 which is in turn connected with the pointed crank 165. When the float and arm 164 are up, in the position shown in Figure 4, the roller 166 is held on the right side of the crank, and compression spring 167 forces the cam 168 to rotate in a counterclockwise direction, opening valve 169 so that gas entering at inlet 171 is discharged through outlet 172. As the float and crank are lowered and roller 166 passes over the peak 173 of crank 165, cam 168 is instantaneously rotated in a clockwise direction closing valve 169, opening valve 174, shutting off the flow of gas through outlet 172, and directing the flow of gas through outlet 175. As the float and arm 164 are raised from a low position to a point at which the roller again passes over peak 173, the cam 168 is again instantaneously shifted to change the direction of flow, the outlet valves 169 and 174 are held in a closed position by springs 176 and 177 respectively when not otherwise raised by the cam 168 so that only one of the outlet valves is open at a time. Three-way valves are not always necessary or desirable in the case of the allowable control valve 66 and the interlock valves 151 and 162, so these 3-way valves can be used as 2-way valves by merely plugging one of the outlets. Alternatively, snap-acting 2-way valves, as well-known in the art, can be substituted. Three-way snap-acting valves of the type above described are available commercially from various suppliers. Fisher Governor Company's snap-acting pilot Type 772B is of the type described above. A snap-acting valve of this type is particularly desirable in the case of the metering tank upper and lower float and pilot control valves.

Figure 5:
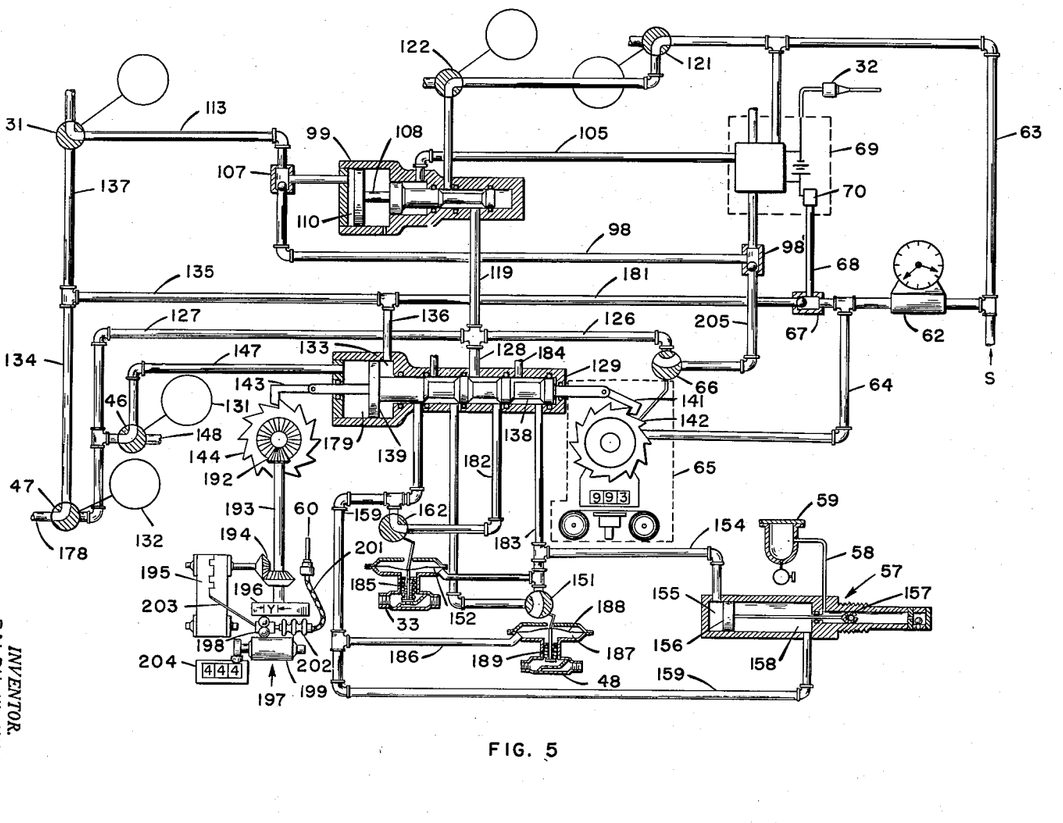
Figure 5 is a schematic flow diagram similar to that shown in Figure 2 except that the controls are in position to empty a full metering tank and run it to a pipeline.

After the metering tank inlet valve 33 has been opened as above described, liquid entering the metering tank first closes lower float and pilot control valve 47 by float 132 as the liquid rises in the metering tank. When lower float and pilot control valve 47 closes it vents chamber 133 through lines 136, 135, 134, and 178 to the atmosphere as shown in Figure 5. The position of the sequence control valve member 138, however, remains unchanged at this time. Within a few minutes, typically about 2–10 minutes, the level of liquid in the metering tank 15 lifts float 131, snapping upper float and pilot control valve 46 to an open position, admitting gas into chamber 179 of the sequence control valve 129 through line 147, displacing gas from chamber 133 through the open vent line as described above and displacing the sequence control valve member 138 and piston 139 to the right. With this member in the righthand position, gas from line 128 is admitted to line 182. At the same time the gas in chamber 152 of metering tank inlet valve 33 is bled to the atmosphere via line 183, sequence control valve 129 and vent line 184. As this gas is displaced from the chamber by the force of spring 185, interlock valve 162 is opened permitting gas from line 182 to flow via lines 159 and 186 into chamber 187 under diaphragm 188 of metering tank outlet valve 48 against the force of spring 189 opening the metering tank outlet valve and simultaneously closing interlock valve 151. Gas from the open sequence control valve and line 182 also passes through line 159 to chamber 158 of the sample pump 57, displacing power piston 156 and pump piston 157 to the left, thus pumping a sample of oil through line 58 to the sample accumulation chamber 59. As the power piston is displaced to the left, gas from power cylinder 155 is vented to the atmosphere through lines 154 and 183, sequence control valve 129, and vent line 184.

When the sequence control valve member 138 moves to the right, as above described, ratchet 141 moves to the right one unit or notch on the allowable gear 142 to be in position to advance that gear one unit in a counterclockwise direction when this valve member is again returned to the left, i.e., when the metering tank is emptied. Also, the ratchet 143 is moved to the right with the sequence control valve member rotating the temperature gear 144 one unit in a clockwise direction. This temperature gear then, through a set of beveled gears 192, rotates shaft 193. A second set of beveled gears 194, which is rotated by shaft 193, advances a temperature recording chart 195. Disk 196 of an integrating mechanism 197 is also rotated by shaft 193 simultaneously with the advancement of the temperature recording chart. This disk then through a set of balls 198 rotates cylinder 199. The rotation of disk 196 being a constant, the rotation of cylinder 199 is proportional to the temperature of the oil in the metering tank as indicated on the temperature bulb 60. This temperature bulb is connected by a capillary tube 201 to a bellows 202 which positions the balls 198 at a distance $y$ relative to the center of rotation of disk 196 proportional to the oil temperature as indicated by the temperature bulb. The position of these balls relative to the center of rotation of disk 196 (the distance $y$) is indicated on the temperature recording chart 195 by pen 203. Inasmuch as the temperature of the oil is typically different from the temperature of the atmosphere, and inasmuch as the temperature recording chart advances a reasonably constant amount as each metering tank full of oil is run, the record on the temperature recording chart clearly shows the number of tanks of oil which have passed through the metering tank. This then is a double check on the counter which indicates directly the number of metering tanks of oil run, as discussed hereinafter. The rotation of cylinder 199 is indicated on a counter 204 which is a summation of the individual temperature readings for each metering tankful of oil run. Having this summation of temperatures and the number of runs either from the temperature recording chart or from the run counter, the average temperature is obtained by dividing the sum by the number of runs. Integrators of this type are well-known in the art and are available at various places commercially. The Librascope Integrator, available from Librascope, Inc., Glendale, California, is an example. The integrator can, of course, be adapted to indicate or record directly the average temperature of all oil run during a predetermined period.

With the metering tank outlet valve 48 open and the metering tank inlet valve 33 closed, the oil in the metering tank runs by gravity or is pumped from the metering tank into the pipeline. As the oil level in that tank descends the first action is the lowering of float 131 on upper float and pilot control valve 46, closing that valve and venting chamber 179 through line 147 and vent line 148. Nothing further occurs until the oil level has descended to the point at which float 132 on lower float and pilot control valve 47 switches that valve and again admits gas from line 127 into the chamber 133 via lines 134, 135, and 136 as discussed above in connection with the description of Figure 2. Before the sequence control valve member 138 can be again displaced to the left, however, to refill the metering tank, it will be noted that the system automatically first determines whether the daily and monthly allowables have been produced, whether the quantity of liquid in production tank 11 is adequate to fill metering tank 15 completely, and whether the quality of the oil below the production tank outlet 29 meets the predetermined standard. These determinations are accomplished as follows. If the allowable, either daily or monthly, has been run, allowable valve 66 will be open permitting gas from line 126 to flow through line 205, 2-way check valve 98', line 98, and 2-way check valve 107 into chamber 110, closing the master control valve 99. If the allowables have not been run, allowable valve 66 remains closed. If the liquid level in production tank 11 is below low level float and pilot control valve 31, that valve is open allowing the gas passing through the metering tank low level and pilot control valve 47 to pass via lines 134, 137 and 113 and 2-way check valve 107 into chamber 110. This also closes the master control valve 99. The quality of the oil in the production tank between the condenser plates 74 and 75 is also determined by again energizing the monitor in quality control box 69. Gas passing through lower float and pilot control valve 47 is directed to pressure switch 70 via lines 134, 135, 181, 2-way check valve 67 and line 68. If the quality is substandard, solenoid valve 87 is energized and thus, as described above, directs pressure gas into chamber 110 via line 98, closing the master control valve 99. This operation is particularly significant in that in all cases the pressure required to close valve 99 is less than the pressure required to shift the sequence control valve member and therefore the master control valve is closed, if at all, before the sequence control valve member is shifted to open the metering tank inlet valve 33. This sequence of operation may be arranged by proper adjustment of the piston diameters or loads on the master control valve and the sequence control valve. Should any of these parameters change after the sequence control valve member 138 has been shifted to open the metering tank inlet valve 33, oil will continue to run from the production tank into the metering tank until the latter is completely filled and then emptied again. Thus, as indicated above, it is an important feature of this invention that in the automatic operation of the metering system under no circumstance can the metering tank be partially filled and allowed to remain only partially filled. Instead it always fills completely and empties completely regardless of changing conditions during the filling and emptying cycles.

Figure 6:
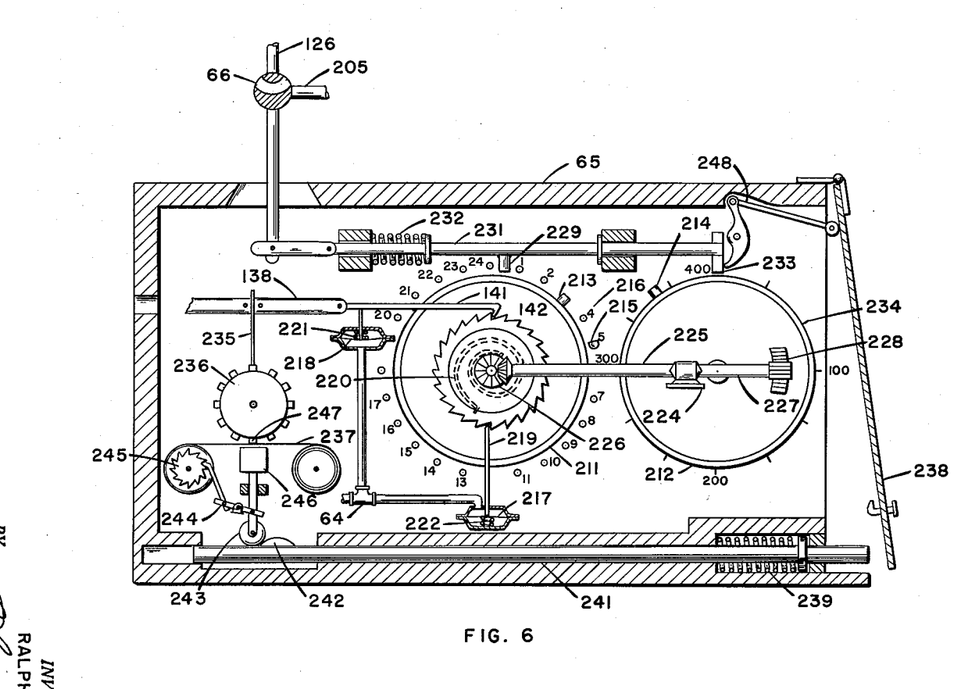
Figure 6 is a view partially in cross section of an apparatus for automatically regulating the daily and monthly production from a tank battery in accordance with a predetermined schedule or allowable.

Reference will now be made to Figure 6 for a more detailed description of the construction and operation of the allowable control or shut-down device located in allowable control box 65. A daily allowable control disk 211 and a monthly allowable control disk 212 which may be coaxially mounted on a common shaft or separately mounted on different axes as indicated are initially set with the daily allowable indicator 213 and the monthly allowable indicator 214 on the daily and monthly allowables respectively. More particularly, a stop 215 is set in the appropriate hole in the daily allowable index 216. This stop acts to place or position the daily allowable indicator 213 when the buyer's time clock and control valve 62 opens and admits gas to line 64. This gas applies pressure to diaphragms 217 and 218 unlatching the pawl 219 and raising ratchet 141 so that torsion spring 220 rotates the allowable control disk in a clockwise direction until daily allowable indicator 213 strikes stop 215. Since the buyer's clock and control valve 62 is open only for a few minutes as discussed above, ratchet 141 and pawl 219 are reactivated or released by springs 221 and 222 respectively when the buyer's clock and control valve 62 is closed and the gas vented. Gas from line 181 is not admitted to line 64 due to the action of 2-way check valve 67 closing on the right end. Unidirectional clutch 224 prevents the rotation of monthly allowable control disk 212 as shaft 225 is rotated by bevel gear 226 with the daily allowable control disk 211 in a clockwise direction to reset the daily allowable. However, as the daily allowable control disk is rotated in a counterclockwise direction by the movement of sequence control valve member 138 and ratchet 141, clutch 224 is effective and rotates shaft 227 which in turn through ring gear and pinion 228 advances the monthly allowable control disk 212 in a counterclockwise direction by one unit. As each tank of oil is run and before the metering tank inlet valve 33 can be opened, the daily allowable control disk 211 and the monthly allowable control disk 212 are thus advanced one dump or unit in a counterclockwise direction. At the end of the preset daily run, daily allowable indicator 213, having advanced stepwise as each tank full of oil is run, strikes the arm 229 and drives the shaft 231 to the left against the force of compression spring 232. As this shaft moves to the left it rotates allowable valve 66 in a clockwise direction opening the valve so that gas in line 126 flows via line 205, 2-way check valve 98', line 98, and 2-way check valve 107 to chamber 110 closing master control valve 99 and stopping the daily run. When the buyer's clock and control valve 62 opens again the next day at a predetermined time, daily allowable control disk 211 is again released and allowed to rotate in a clockwise direction until daily allowable indicator 213 again strikes stop 215. As this daily allowable control disk 211 is again rotated stepwise in a counterclockwise direction each time a tank of oil is run through metering tank 15, the monthly allowable control disk 212 is also rotated in a counterclockwise direction. Due to the unidirectional clutch, the monthly allowable control disk always continues to advance, however, in a counterclockwise direction so that the daily runs throughout the month are accumulated and the monthly allowable control index 214 indicates the summation of all daily runs or, if desired, the remaining number of metering tanks of oil yet to be run to make the monthly allowable. Eventually when the monthly allowable has been run, monthly allowable indicator 214 strikes arm 233. Then, regardless of the position of the daily allowable control disk, shaft 231 is driven to the left and reopens allowable valve 66 to close master control valve 99 and shut down the operation until the monthly allowable is reset. Since there is no provision for automatically reversing the monthly allowable control disk, the tank battery is thus automatically shut down when the monthly allowable has been run. The tank battery can be activated again only by manually reversing the monthly allowable control disk 212. Typically it is thus reversed at the first of each month to a position on the monthly allowable index 234 at which the number of runs will produce to the monthly allowable for the lease.

While the amount of oil run during a month or any other predetermined period of time can be determined from an observation of the position of monthly allowable control disk 212, it is generally desirable in accordance with the practice in the industry to produce a record of the amount of oil run. This is accomplished in the following manner. When the sequence control valve member 138 reciprocates as above described, it moves counter arm 235. Alternate strokes of this arm advance the counter 236 one unit. The counter may indicate directly the total number of tanks of oil run through the metering tank or it may be calibrated directly in barrels. Also the counter may be indicating or recording or both indicating and recording, but preferably it is recording and the number of tanks of oil run is indicated on the bottom side of the counter adjacent the moving run tape 237. Each dump of the metering tank may be recorded on the run tape but preferably this tape is advanced and the reading on the counter is printed only when the tamperproof box 65 is opened and closed. Printing of the number of runs on the run tape is accomplished as follows. When the tamperproof box door 238 is opened, compression spring 239 urges shaft 241 to the right, forcing cam 242 under the roller 243, first raising and then lowering the roller. As the roller is raised the ratchet mechanism 244 on the run tape advance mechanism 245 is lowered and reset to advance the tape. At the same time the hammer 246 is raised urging the tape against the numbers 247 on the lower side of counter 236. As the cam 242 moves further and roller 243 passes the peak of the cam, the roller is lowered by the weight of hammer 246 or by a spring or other means and ratchet mechanism 244 through the tape advance mechanism 245 advances the tape. A section of this tape can be removed as a permanent record at any time, particularly at the end of a month, and the end of the tape can again be connected to the tape advance mechanism to produce a new record. As a special precaution to prevent miscounting of runs, means may be provided to shut the tank battery down while the tamperproof box door 238 is open. When this door is opened a lever and cam mechanism 248, moves shaft 231 to the left, opening allowable valve 66 and thus closing master control valve 99 in the same manner as it is closed when the daily or the monthly allowable has been run. This prevents the running of a tank of oil after the current run (if running a metering tank of oil) is completed while the door on the tamperproof box 65 is open and at a time when there could be some interference with the counting or recording mechanism. When the tamperproof box door 238 is again closed, compression spring 232 acting on shaft 231 reopens the allowable valve and permits control of the operation by the allowable control mechanism. In any case, whether or not the tank battery is thus shut down when door 238 is opened, when the door is closed, roller 243 is again raised and lowered as it passes over cam 242, thus advancing the run tape 237 and printing thereon the reading on counter 236. The run tape 237 thus indicates the counter reading both when the door is opened and when it is closed so as to prevent or at least indicate any change of the counting mechanism during the time the door is open.

Figure 7:
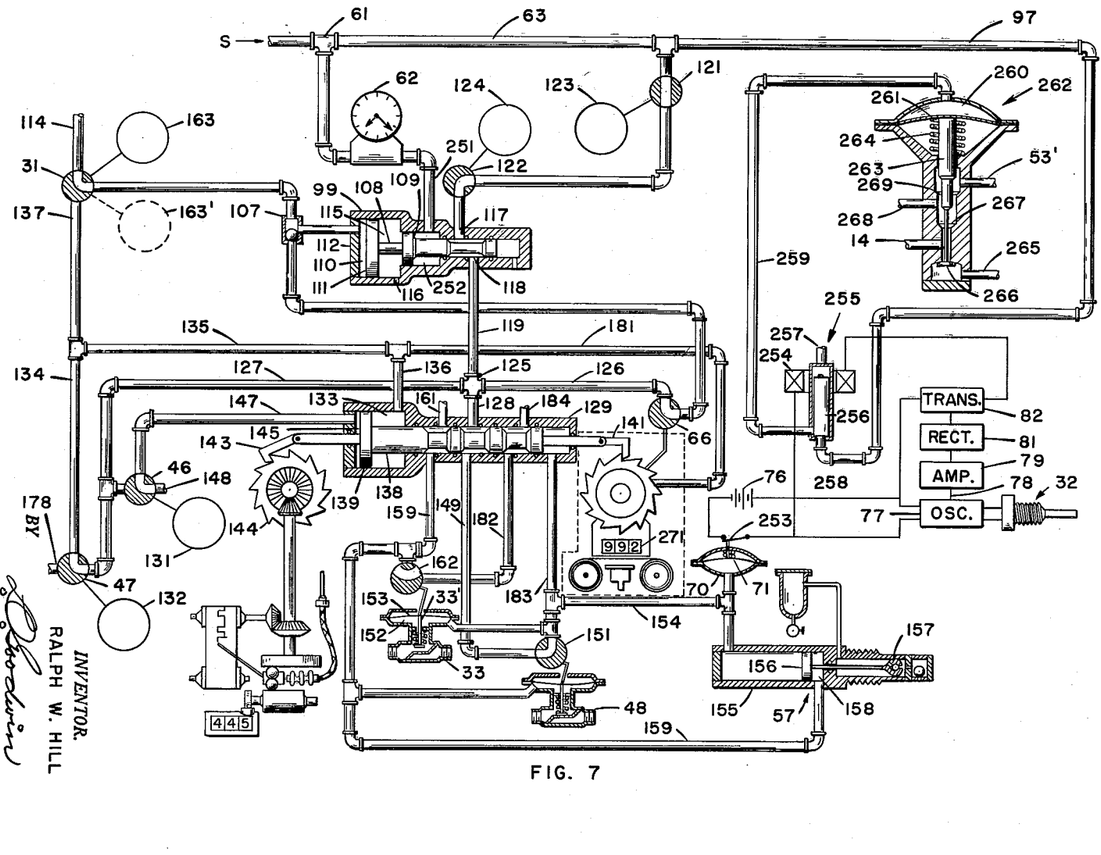
Figure 7 is a schematic flow diagram of an alternative embodiment for the pneumatic system shown in Figure 2 to control the custody transfer of liquid.

As indicated above, the quality of the oil entering the metering tank may be determined within the production tank, desirably below the oil outlet of the metering tank and only intermittently. In some cases, however, the quality of the oil may be determined above the production tank outlet, at the same elevation as the outlet, or even within the outlet line 14 itself. Furthermore, it may be desirable in some cases to determine continuously the quality of the oil entering the metering tank. Such continuous determination of quality as the oil flows prevents running sub-standard oil should the quality of the oil in the production tank be changed during the time that the metering tank is being filled. An embodiment of the control system, showing means for performing such an operation while at the same time preventing any residence time for static oil in the metering tank, is shown in Figure 7.

Referring now to that figure for a more detailed description of such a control system, supply gas for the pneumatic system enters the system again through inlet T 61. This supply gas then divides, part of it going to the buyer's clock and control valve 62 and thence directly to the master control valve 99. As in the embodiment described above, this clock is preset by the receiving pipeline to start the operation of running oil at some desirable time each day. When the predetermined time arrives, the buyer's clock and control valve opens admitting gas via line 251 to chamber 252. This gas, reacting against piston 109, displaces the valve member 108 to the left, opening the master control valve. Supply gas flowing through line 63 also passes through metering tank high level safety valve 121 and metering tank low level safety valve 122, assuming the system is in proper operating condition as above described and these valves are open, through inlet port 117 and outlet port 118 of the open master control valve via line 119, cross 125 and line 128 to the sequence control valve 129 and so forth, as described above. When the buyer's clock and control valve 62 opens, the metering tank is empty as described above and therefore metering tank lower float and pilot control valve 47 is open. Gas flowing from the master control valve through this valve then enters chamber 133 via line 134, and 135, and 136 and displaces sequence control valve member 138 to the left. In that position the sequence control valve passes this supply gas into line 149 through open interlock valve 151 into gas chamber 152 opening metering tank inlet valve 33. This same gas also passes via line 154 to the sample pump 57 and to pressure switch 70. This gas acting on diaphragm 71 closes the single pole single throw switch 253 and battery 76 energizes the oscillator 77 connected with probe 32. Thus any time that metering tank inlet valve 33 is open, probe 32, which in this instance is preferably located in or near the upstream end of line 14, is energized and determines the quality of the oil continuously. When good or above-standard oil is flowing into the metering tank, the oscillator 77 produces a signal in line 78 which after passing through amplifier 79 and rectifier 81 is a unidirectional current signal indicating the presence of good oil at probe 32. This signal controls the current throughput of transistor 82 and thus energizes solenoid coil 254 of 3-way control valve 255 when the oil is good. As this coil is energized, plunger 256 is lifted, closing outlet port 257 and opening inlet port 258 so that supply gas from lines 63 and 97 flows via line 259 into chamber 260 depressing diaphragm 261 of a bypass valve 262.

Figure 8:
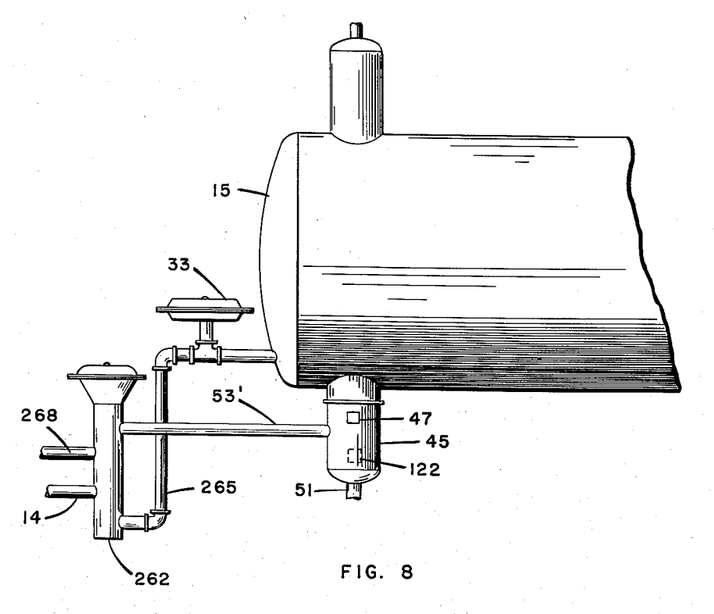
Figure 8 is an elevation view showing certain modifications of Figure 1 to adapt that apparatus to the alternative embodiment of the flow diagram shown in Figure 7.

Bypass valve 262 is a dual function valve adapted to override metering tank inlet valve 33 and bypass the metering tank so that any sub-standard liquid otherwise flowing via line 14 from the production tank to the metering tank is directed to a purification unit such as a heater-treater rather than to the metering tank. At the time bad oil is thus diverted from the metering tank to a treater, this valve also is adapted to empty the metering tank so that the metering tank will not at any time stand partially filled and thus permit paraffin and other solids within the oil to be precipitated on the metering tank walls or floats. More particularly, bypass valve 262 is connected into line 14 as shown in Figure 8 either upstream or downstream from metering tank inlet valve 33 so that it overrides that valve. It is also connected into a metering tank outlet line 53' in such a manner that when 3-way control valve 255 is in a closed position as indicated in the drawing, i.e., when probe 32 is in bad or sub-standard oil, the valve member 263 is held up by compression spring 264. Flow of liquid from the production tank outlet line 14 is then diverted from the metering tank inlet line 265, by closing valve 266 and opening valve 267, into a line 268 which directs the bad oil from the production tank to a purification system. When the valve member 263 rises, diverting liquid from the production tank to the treater, it also opens valve 269 and drains the metering tank via line 53' into the treater line 268. Oil in treater line 268 may flow by gravity back into a lower heater-treater or other purification unit such as a dehydrator or demulsifier and thence back into the production tank for recirculation to the metering tank. Where such purification unit is higher than the bottom of the metering tank, the oil in treater line 268 may obviously be pumped back. In such case the signal or the absence of a signal produced by the oscillator 77 or by the gas leaving 3-way control valve 255 may be used to start the pump and discharge sub-standard liquid entering treater line 268 back into a high pressure treater, or the like, so that the pump runs only when substandard oil is encountered. This pump first empties the metering tank and continues to recirculate oil through the production tank and the B. S. and W. treater until the quality of the oil is again up to the predetermined standard. When this predetermined standard as indicated by the output of the oil monitor is attained, transistor 82 de-energizes coil 254 and 3-way control valve 255 is opened. The gas in chamber 260 is then bled off through line 259 and outlet port 257. Valves 267 and 269 are then closed and valve 266 is opened by spring 264. This closes the metering tank drain line 53', stops all flow to the purification unit through line 268 and directs oil from the production tank back into the metering tank. The override which diverts oil from the metering tank is thus removed and flow to the metering tank is controlled by the metering tank inlet valve 33 as above described. During the time that the substandard oil is being recirculated, the sequence control valve 129 remains unchanged and thus is ready to take over the control of operations in the same position at which it lost control when the substandard oil was encountered and the quality override control took over. Since the sequence control valve is not affected by the recirculation of substandard oil, no record of the temperature or amount of liquid being recycled is necessarily made. Accordingly, the allowable control device does not change during the recycling operation. The counter 271 therefore indicates only the number of dumps of the metering tank, i.e., the number of times lower float and pilot control valve 47 opens. It will be apparent that while some modification may be made in the method and apparatus for controlling the quality of the liquid entering the metering tank, the operation of the tank battery control system in this embodiment is otherwise substantially identical to the operation of the control system described in connection with the embodiments shown in Figures 2 and 5.

From the foregoing description it can also be seen that in the preferred process the metering tank of an automatic custody transfer system is maintained in one of three conditions, viz., (1) filling, (2) emptying, or (3) empty, i.e., that the metering tank is never full or partly full for any length of time. In other words, the metering tank is either empty or in a transitory condition. It can also be seen that the apparatus and the method of operation can be varied considerably without departing from the spirit of the invention. For example, whereas in the preferred embodiment a pneumatic system has been employed for controlling the operations, a hydraulic or an electric system, or various combinations thereof, can be substituted in some cases to accomplish the same or substantially the same result. The pneumatic system is preferred mainly because of the unavailability of electrical power and the availability of pressure gas at most tank batteries. Additionally it can be seen that, whereas in the preferred embodiment liquid is metered volumetrically using floats, in some cases—particularly where the deposition of paraffin or other solids on the floats renders volume measurement inaccurate, other means employing a different parameter of the oil, such as the weight, density or light transparency of the oil, may be substituted to control the operation of filling and emptying the metering tank, etc. Accordingly, it can be seen that this invention is not limited to the apparatus above described but should be construed to be limited only by the scope of the appended claims.

I claim:

1. An apparatus for measuring liquid comprising a storage tank having an inlet and an outlet for liquids, a metering tank having an inlet and an outlet for liquids, a filling line connecting said storage-tank outlet and said metering-tank inlet for filling said metering tank from said storage tank, closure means in said filling line to prevent flow therethrough, a discharge line connected to said metering-tank outlet, a discharge valve in said discharge line, means responsive upon completion of the emptying of said metering tank by said discharge line to close said discharge valve and to open said closure means, means responsive to the opening of said closure means to maintain said discharge valve closed while said closure means is open, quality-responsive means at least in part within said storage tank and responsive to the quality of the liquid therein before it enters said filling line, level-responsive means responsive to changes in the amount of liquid above said storage-tank outlet between more and less than the capacity of said metering tank, and control means actuated by said quality- and said level-responsive means and acting on said closure means to prevent it from opening when either of the two following conditions exists: (1) when the quality of said liquid in said storage tank is below a predetermined standard, and (2) when the quantity of liquid in said storage tank above said storage-tank outlet is less than the capacity of said metering tank, whereby said metering tank is maintained empty until there is a sufficient amount of above-standard-quality liquid in said storage tank to fill said metering tank completely.

2. An apparatus for measuring liquid comprising a storage tank having an inlet and an outlet for liquids, a metering tank having an inlet and an outlet for liquids, a filling line connecting said storage-tank outlet and said metering-tank inlet for filling said metering tank from said storage tank, closure means in said filling line to prevent flow therethrough, a discharge line connected to the outlet of said metering tank, means responsive upon completion of the emptying of said metering tank by said discharge line to open said closure means and admit liquid from said storage tank to said metering tank, means responsive to the opening of said closure means to prevent flow through said discharge line as long as said closure means is open, level-responsive means responsive to changes in the amount of liquid above said storage-tank outlet between more and less than the capacity of said metering tank, and control means actuated by said level-responsive means and acting on said closure means to permit opening of said closure means only when the quantity of said liquid in said storage tank above said storage-tank outlet is at least as great as the capacity of said metering tank, whereby said metering tank is maintained empty until there is a sufficient quantity of liquid in said storage tank to fill said metering tank completely.

3. An apparatus for measuring liquid comprising a storage tank having an inlet and an outlet for liquids, a metering tank having an inlet and an outlet for liquids, a discharge line connected to said metering-tank outlet, a filling line connecting said storage-tank outlet and said metering-tank inlet, a normally closed valve in said filling line, control means acting on said valve to hold it open while a predetermined amount of liquid is being admitted into said metering tank, means responsive to the opening of said valve to prevent flow through said discharge line while said valve is open, level-responsive means responsive to changes in an amount of liquid in said storage tank above said storage-tank outlet, which amount is about equal to the capacity of said metering tank, and quality-responsive means responsive to the quality of said liquid entering said metering tank, said control means being actuated by both said level- and said quality-responsive means and acting on said valve to open it and admit said liquid from said storage tank into said metering tank only when the volume of an above-standard quality liquid in said storage tank above said storage-tank outlet is at least equal to the capacity of said metering tank, whereby said metering tank is maintained empty until it can be completely filled with above-standard quality liquid.

4. An apparatus for measuring liquid comprising a storage tank having an inlet for liquids and an outlet for liquids near the bottom of said tank, a metering tank having an inlet and an outlet for liquids, a filling line for said metering tank connecting said storage-tank outlet and said metering-tank inlet, an inlet valve in said filling line, a discharge line connected to said metering-tank outlet, a discharge valve for controlling flow through said discharge line, control means responsive to the action of said discharge valve and to the level of liquid in said metering tank and acting on said inlet valve to open said inlet valve when said discharge valve closes and to close said inlet valve and open said discharge valve after a predetermined volume of liquid flows into said metering tank, quality-responsive means at least in part within said storage tank to respond when the quality of said liquid in said storage tank is below a predetermined standard, quantity-responsive means in said storage tank to respond when a changing quantity of liquid in said storage tank above said storage-tank outlet becomes about equal to the capacity of said metering tank, counting means to indicate the quantity of liquid measured out of said metering tank through said discharge line, and overriding control means actuated by said quality- and quantity-responsive means and by said counting means and acting on said inlet valve to prevent it from opening when any one of the following conditions exists: (1) the quality of said liquid in said storage tank is below said predetermined standard, (2) the quantity of liquid in said storage tank above said storage-tank outlet is less than the capacity of said metering tank, and (3) a predetermined quantity of liquid has been measured out of said metering tank, whereby said metering tank is maintained empty after said predetermined liquid quantity has been measured.

5. An apparatus for measuring liquid comprising a storage tank having an inlet and an outlet for liquids, a filling line connecting said storage-tank outlet and said metering-tank inlet, an inlet valve in said filling line, a discharge line connected from said metering tank outlet to a liquid-receiving system, a discharge valve in said discharge line, control means actuated by said discharge valve and acting on said inlet valve to open it when said discharge valve closes, quality-responsive means at least in part within said storage tank to respond when the quality of liquid therein is below a predetermined standard, quantity-responsive means in said storage tank to respond when there is about one metering tank of liquid in said storage tank above its outlet, counting means to indicate the quantity of liquid metered out of said metering tank into said receiving system, and an override means responsive to said quality-responsive, said quantity-responsive, and said counting means and acting on said control means to prevent said inlet valve from opening when any of the following conditions exists: (1) the quality of said liquid in said storage tank is below a predetermined standard, (2) the quantity of liquid in said storage tank above its outlet is less than a metering tank of liquid, and (3) a predetermined allowable quantity of liquid has been discharged into said receiving system, whereby said metering tank is maintained empty after said allowable liquid quantity has been been discharged.

6. In combination with apparatus for measuring liquid including a storage tank having an inlet and an outlet for liquids, a metering tank having an inlet and an outlet for liquids, a filling line connected between said storage-tank outlet and said metering-tank inlet, a discharge line extending from said metering-tank outlet, and control means for suspending flow in said filling line while said liquid previously accumulated in said metering tank is flowing out through said discharge line, said control means acting to initiate flow through said filling line after said liquid in said metering tank has been discharged and said metering tank is empty and to prevent flow through said discharge line during flow through said filling line, the improvement comprising quantity-responsive means responsive to a changing amount of liquid above said storage-tank outlet which is about equal to a metering tank of liquid, and overriding means actuated by said quantity-responsive means and acting on said control means to prevent it from initiating flow in said filling line when the volume of liquid in said storage tank above said storage-tank outlet is less than the volume of said metering tank, whereby said metering tank is maintained empty unless it can be completely filled without interruption.

7. An apparatus for measuring oil comprising a production tank having an inlet and an outlet for oil, a metering tank having an inlet and an outlet for oil, a filling line connecting said production-tank outlet and said metering-tank inlet, a metering-tank inlet valve in said line, means connected to said metering-tank outlet and including a discharge valve for discharging liquid from said metering tank, a first control means responsive to metering-tank oil levels and actuating said inlet and said discharge valve to close said inlet valve when a predetermined volume of oil has passed into said metering tank, and to open said discharge valve nearly simultaneously with but after closure of said inlet valve, a second control means responsive to metering-tank oil levels and actuating said discharge valve to close it after the discharge of said predetermined volume from said metering tank and to open said inlet valve nearly simultaneously with but after closure of said discharge valve, level-responsive means to respond when a changing quantity of oil in said production tank above its outlet is about equal to but not less than the capacity of said metering tank, and override control means actuated by said level-responsive means and acting on said second control means to prevent opening of said inlet valve when the volume of oil in said production tank above its outlet is less than said predetermined volume, whereby said metering tank is maintained empty unless it can be completely filled without interruption.

8. An apparatus according to claim 7 including quality-responsive means at least in part within said production tank for responding when the concentration of an adulterating liquid in the oil in said production tank is above a predetermined standard, and in which said override control means is also responsive to said quality-responsive means and acts upon said control means to prevent opening of said inlet valve when the concentration of said adulterating liquid in said oil adjacent said outlet exceeds said predetermined standard.

References Cited in the file of this patent

UNITED STATES PATENTS 2,773,556     Meyers et al. ___________ Dec. 11, 1956

OTHER REFERENCES

Article by D. C. Meyers, in Oct. 17, 1955 issue of Oil and Gas Journal, pages 111–117.